United States Patent [19]
Etherington et al.

[11] Patent Number: 5,954,188
[45] Date of Patent: Sep. 21, 1999

[54] CONVEYOR BELT

[75] Inventors: Michael Etherington, Winchester; William F. Funkhouser, Mount Jackson, both of Va.

[73] Assignee: Ashworth Bros., Inc., Fall River, Mass.

[21] Appl. No.: 08/873,393

[22] Filed: Jun. 12, 1997

[51] Int. Cl.[6] ................................................. B65G 21/18
[52] U.S. Cl. ................................................................... 198/778
[58] Field of Search ..................................... 198/848, 853, 198/778

[56] References Cited

U.S. PATENT DOCUMENTS

| | | | |
|---|---|---|---|
| 4,078,655 | 3/1978 | Roinestad | 198/848 |
| 4,971,191 | 11/1990 | Lapeyre | 198/853 |
| 5,141,102 | 8/1992 | Roinestad et al. | 198/778 |
| 5,265,715 | 11/1993 | Yoshimura et al. | 198/848 |
| 5,431,275 | 7/1995 | Faulkner | 198/778 X |
| 5,566,817 | 10/1996 | Meeker | 198/848 |
| 5,622,252 | 4/1997 | Raum | 198/778 |
| 5,645,160 | 7/1997 | Palmaer et al. | 198/853 |

FOREIGN PATENT DOCUMENTS

| | | |
|---|---|---|
| 0 456 145 | 11/1991 | European Pat. Off. . |
| 0 642 997 | 3/1995 | European Pat. Off. . |
| 2 137 948 | 10/1984 | United Kingdom . |

OTHER PUBLICATIONS

European Search Report dated Sep. 24, 1998 from European Patent Application No. 98.201929.1.

*Primary Examiner*—James R. Bidwell
*Attorney, Agent, or Firm*—Banner & Witcoff, Ltd.

[57] ABSTRACT

A conveyor belt with rods and connective links that engage one another so as to resist lateral deflection and rotational movement about the rods during conveyor operation. The rods have a large diameter through most of their length, and a smaller diameter at their ends where they are attached to the connective links. The transition between the large diameter and the smaller diameter is a chamfered section which is captured within an aperture of the links to constrain the links from lateral movement along the rod. The links are further constrained on the rods by forming an upset or buttonhead at the ends of the rod and resistance welding the rod to the link apertures. The additional fixation steps used in conventional belt manufacture are thus eliminated. By affixing the links and rods together in the manner disclosed, repeated movements of the link legs relative to the rods are eliminated thereby significantly reducing the chances of fatigue failure of the links.

29 Claims, 12 Drawing Sheets

CONVEYOR BELT

FIELD OF THE INVENTION

The present invention relates to conveyor belts generally comprising a support surface, connective rods and connective links which are configured to provide improved column strength to the rods and eliminate welding the links to the rods as is necessary with conventional components and assembly methods.

BACKGROUND OF THE INVENTION

Wire and plastic conveyor belt systems are widely used in a great variety of industrial fields. A wire mesh or plastic overlay can be used with the rods to provide a support surface of a conveyor belt. The wire or plastic components of the overlay are intermeshed together by connecting rods which extend transversely across the width of the belt. Typically the intermeshed overlay components are connected to one another by the connecting rods. Alternatively, the support surface provided by the rods can be used without an overlay. The ends of the rods are inserted into connective links and the rods and links are welded together. The connective links may serve as tractive links around a sprocket wheel.

In conveyor belts used to move material through processing machinery, such as coating, freezing, cooking, etc., the process cycles have been carefully determined so that the material is conveyed to provide an optimum dwell time in processing. When there is a demand for a higher output of finished product, the most effective way of increasing the output is to enlarge the conveying surface to enable more product or material to be conveyed through the process cycle.

In a system in which the conveyor traverses a spiral path, the conveyor belt is driven by friction on the inside edge of the spiral, and the belt must be sufficiently strong to withstand the resultant driving forces on the links and rods. The tension in the belt is always a design consideration in changing any of the belt parameters such as the size and strength of the links and rods since both of these changes affect the weight of the belt. The heavier the belt, the higher the resultant tension when the belt is driven.

In spiral systems, when a conveyor belt is subjected to tensions above an allowable limit, for instance while turning with an inside edge in a collapsed condition, the forces on the belt components comprise a tangential force on the outer link and a radially directed inward force which pulls the belt against the cylindrical driving surface. If this radially directed force component becomes sufficiently high, the connective rods buckle due to the columnar load placed on them. This is a failure that can occur with any width of belt if the belt is subject to tensions above an allowable limit. For rods above a certain length dimension, it has been observed that the belts will succumb to rod buckling at tensions below the allowable limit. Accordingly, as the width of a belt increases due to the use of longer rods, it takes significantly less tension to buckle the rods.

In a conventional conveyor belt, a current limitation to the size of the conveying surface is the width of the belt due to the column strength of the rods and the potential buckling problem. For example, one of the standards is to use 6-gauge rods which have a uniform diameter along their entire length, and is limited to a maximum length of 38 inches. It has been found that if the rods are made longer than 38 inches, the column strength of the rods poses a weakness to the design and failure by buckling at tensions below the allowable limit can result. This is particularly true in spiral systems which exert a high radial component of force on the rods directed toward the driving surface, that is a force along the length of the rod, and can cause buckling of rods without sufficient column strength.

Figure 15:
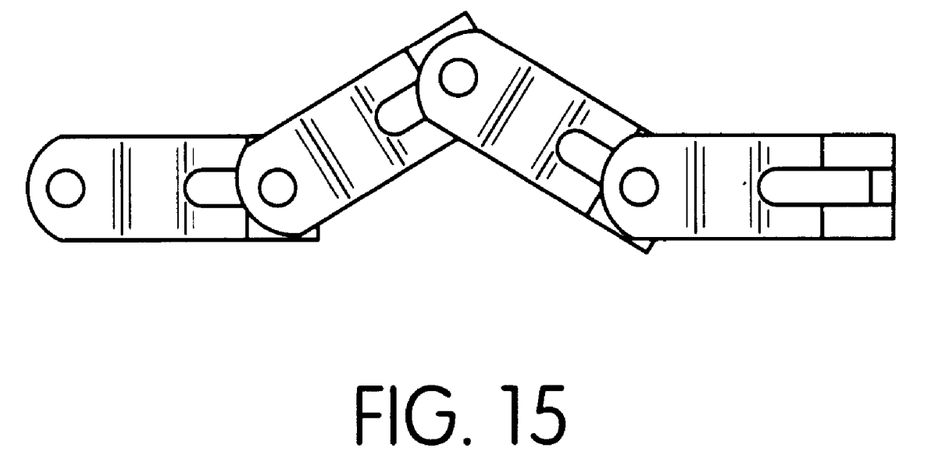
FIG. 15 is a side elevational view of a series of connective links, two of which have tented by moved rotationally relative to the rods.

In conventional conveyor belts, a weld is typically placed at the exterior sides of the link legs to attach the link to the rod. This weld serves two purposes. Firstly, it achieves positive fixation of the link to the outermost portion of the rod. This is important because the connective links at the outer edges of a belt are used for driving interface with the drive sprockets so that any transverse or lateral movement of the connective link along the rod will result in misalignment with the sprockets. This will lead to damage to the sprockets, belt and the system. Secondly, the weld prohibits the connective links from rotational movement that leads to "tenting" of the link on the rod. Tenting refers to the rotational movement of the link relative to the rod when the rods move together causing a link to tilt upward about its rod apertures, and is illustrated schematically in FIG. 15. This movement normally occurs on the inside edge of the belt during its collapsed state of operation in a spiral system, and cause the belt to jam during operation resulting in belt and system damage, as well as downtime.

The weld holding the link to the rod is a main area of perceived failure and real failure for conveyor belts since the weld is subjected to numerous stresses during operation. The biggest contributors to weld failures include normal fatigue caused by belt tensions above the allowable limit including lateral deflection of the legs of the connective links and rod buckling. These stresses on the links cause cracks to form in the welds. Even after a weld fails, however, it continues to function to hold the connective links in a fixed position which allows the belt to operate. It has been observed that the weld deposits on the rod act as barriers that trap the connective link in place allowing for proper sprocket and drive engagement. In addition, while tenting has been observed where welds have failed, in general the ragged edges of the fractured welds continue to prevent rotational movement of the connective link.

A conveyor belt with fractured welds is acceptable and operational as long as the system is running under allowable tension limits, however, the problem of perceived failure of the belt arises whenever some of the welds are cracked. Even though a belt with cracked welds is still able to function effectively under normal operating conditions, users who have been repeatedly warned by belt manufacturers that broken welds are precursors to real failure have perceived the broken welds as a failure in and of themselves. There has been a need to positively position the links and prevent their rotation about the rods, and eliminate this perceived problem with conventional belts that raises user complaints and warranty issues.

Besides showing the first signs of fatigue stress, the conventional welds between the links and rods also pose a time-consuming welding step during manufacture. As can be seen from FIGS. 13–14B, the conventional methods require that the connective links be individually welded to the rods. This step is inefficient and expensive.

Another problem with conventional conveyor belts is that the connective links can break when a belt is subjected to tensions above the allowable limit and the welds have previously fractured. Unlike the situation with fractured welds in which the belt can continue to operate under the allowable tension limits, failure of the connective links is the final failure mode of the belt. If the belt is operated at excessive tension above the allowable limit after the welds have fractured, the links will fail.

Since a belt is driven by friction to friction, the connective links are prone to fatigue stresses due to the resultant tension on them. This is because when a belt is driven, the driving friction on the belt tends to draw the belt components together laterally. The periodic starting and stopping of the belt which is inherent to any operation causes the legs of a connective link to deflect laterally with respect to the rod, and to move rotationally with respect to the rod. Additionally the changes in belt tension through the system tend to cause the legs of the connective links to repeatedly defect laterally. The lateral deflection refers to the tendency of the link legs to move inward, toward one another when the belt is driven and to spread outward when the driving friction on the belt is released. The continual movement causes fatigue stresses in the connective link and ultimately to catastrophic link failure. When this occurs, the belt may physically separate resulting in damage to the system and large portions of the belt as well as downtime.

Both the lateral deflection and rotational movement of the link about the rod, i.e. tenting, during operation can result in fatigue failure of the link.

Therefore, there exists a need for a conveyor belt that can provide a larger surface for moving more products or articles through process cycles with structural features that reduce weld failure, decrease deflection and tenting of the links in order to resist fatigue failures, and increase the column strength of the rods to resist buckling. Enlarging the size of the surface is the preferred way to increasing output volume because the process cycles do not have to be altered from their predetermined settings. There also exists a need for streamlining the manufacture of conveyor belts by eliminating the current methods of attaching the connective links to the rods.

SUMMARY OF THE INVENTION

Accordingly, the present invention provides connective links and rods for a conveyor belt and its manufacture which overcomes many of the problems associated with the prior art.

The present invention pertains to a conveyor belt comprising rods of increased diameter for increased column strength to resist buckling which allows the use of longer rods and therefore the construction of wider belts. The increased diameter enables the belt to carry heavier product per foot of belt over conventional belts. Any suitable overlay may be used for the conveyor surface or the rods themselves can be used as a support surface without an overlay. The extended rods enable the conveyor belt to have width greater than 38 inches which is the current limit before column strength of the rods becomes a problem.

Another aspect of the present invention is that the ends of the rods are tapered to a smaller diameter enabling the use of conventionally sized connective links. The transition area between the large diameter and the smaller diameter is a chamfered section which eliminates the high stress concentrations present in a straight-cut, annular transition section. In addition, the chamfered section traps the connective link on the outside of the belt eliminating the potential for lateral or transverse movement of the connective link along the rod.

Yet another aspect of the conveyor belt of the present invention is the elimination of a conventional weld to hold the link to the rod. The connective links positively engage the rods and the formation of an upset or button at the end of the rod results in a resistance weld between the rod and the link aperture. This eliminates the additional fixation steps used in conventional belt manufacture and simplifies production. In this manner, the conventional welds and their attendant problems such as fatigue cracks are eliminated altogether.

Still another aspect of the present invention is the configuration of the connective links to resist lateral deflection and rotational movement about the rods during conveyor operation. Avoiding these movements decreases or eliminates fatigue stresses on the links and significantly decreases the chances for failure of the links.

An additional aspect of the present invention is the provision of a structural feature on the connective link apertures to prohibit rotational movement of the link relative to the rod and thus eliminate the tenting problem.

These and other features and advantages of the invention may be more completely understood from the following detailed description of the preferred embodiments of the invention with reference to the accompanying drawings.

DETAILED DESCRIPTION OF THE PREFERRED EMBODIMENTS

Referring to FIGS. 1–8, the preferred embodiment of the extended width belt 10 is made up of rods 12 of improved design which eliminate the column strength problem. An overlay 14 extends between the ends of the rods to provide a conveying surface. A wire mesh overlay is shown in the figures, but any suitable metal or plastic overlay may be used. The belt may also be used without an overlay. Each rod 12 has a chamfered transition area 16 between a large diameter central portion 18 and reduced diameter portions 20 at the ends. The larger diameter of central portion 18 provides increased column strength and enables a longer rod to be used, thereby providing a wider conveyor belt. Reduced diameter end portions 20 allow conventionally sized connective links to be used for the belt.

Figure 1:
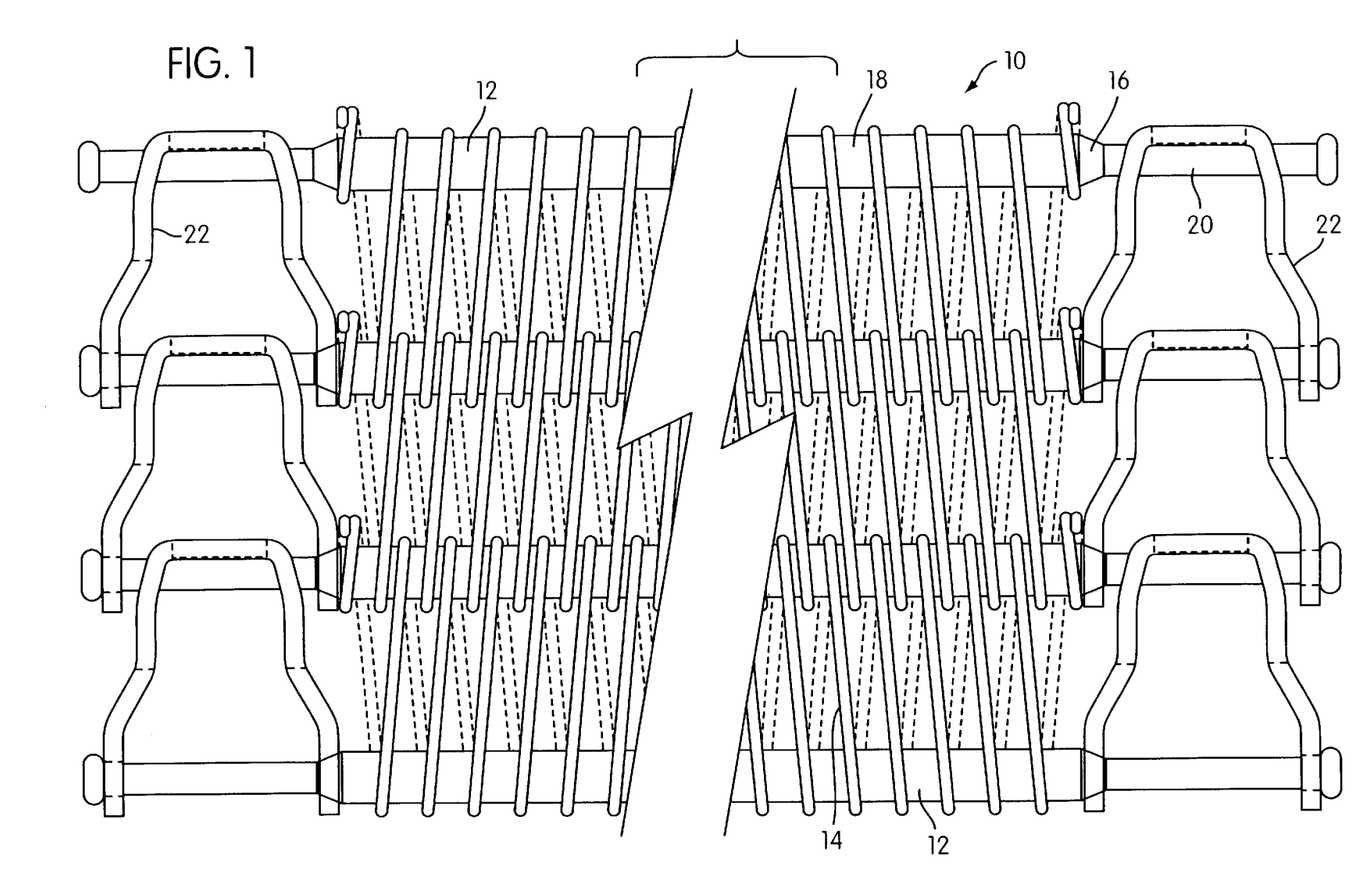
FIG. 1 is a top plan view of a section of the belt in accordance with the first preferred embodiment of the invention shown with a metal overlay.
Figure 2:
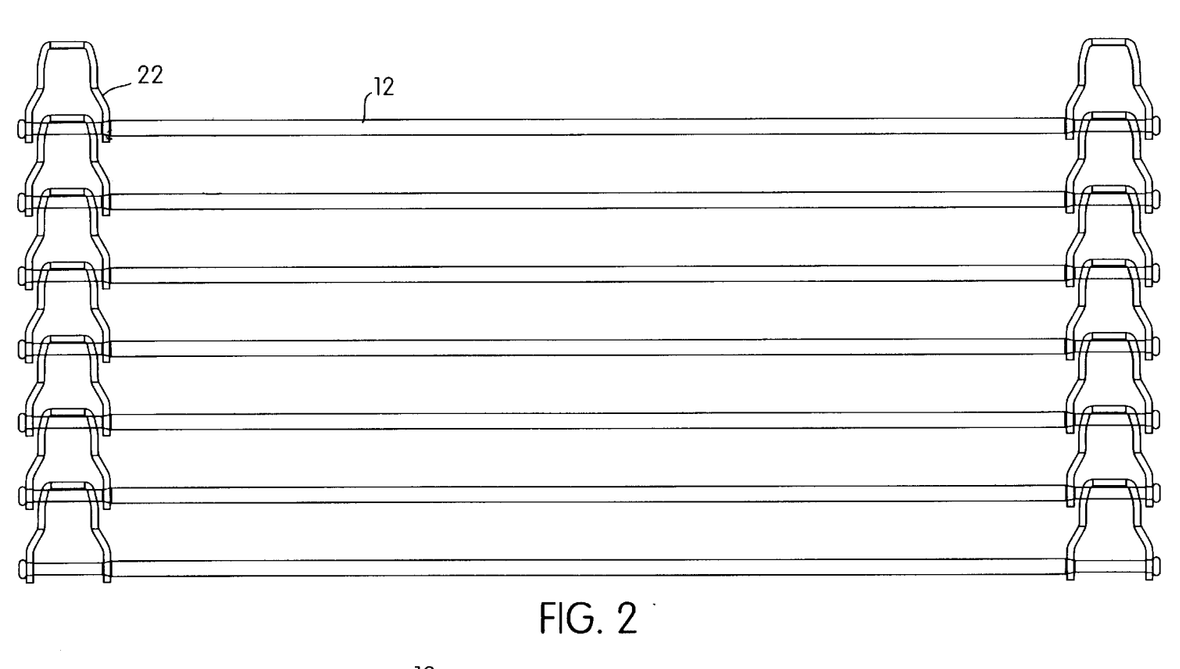
FIG. 2 is a top plan view of a section of the belt of FIG. 1, shown without an overlay.
Figure 3:
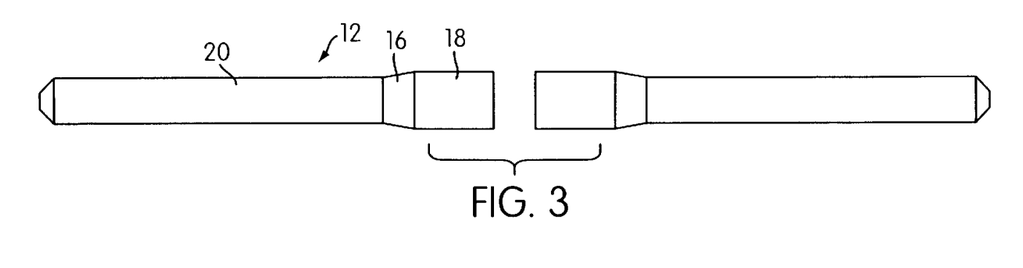
FIG. 3 is a top plan view of a rod of a belt section as shown in FIGS. 1 and 2.

Rods 12 are interconnected by connective links 22 generally have a U-shape with the legs being spaced apart so as to receive the cross-member of an adjacent link. Connective links 22 are provided with a tapered aperture 24 in leg 26 and a round aperture 28 in leg 30. In assembling belt 10, the links are placed so that legs 26 with the tapered apertures lay toward the inside of the belt, and legs 30 lay toward the outside of the belt. Therefore, legs 26 may herein be referred to as the inner legs, and legs 30 may be referred to as the outer legs of the connective links.

Figure 4:
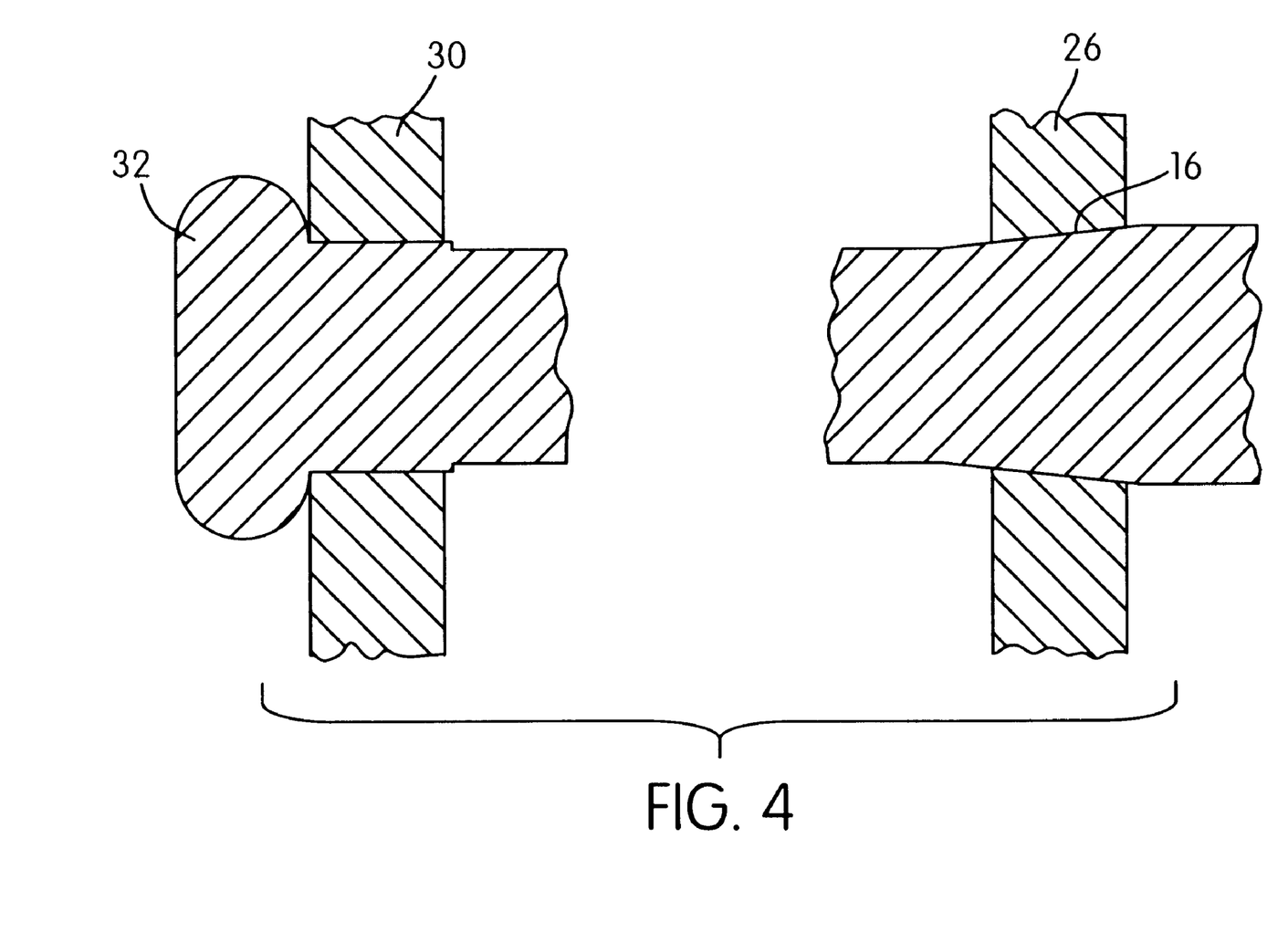
FIG. 4 is a schematic drawing showing a connective link attached to a rod by formation of the buttonhead at the end of the rod.
Figure 5:
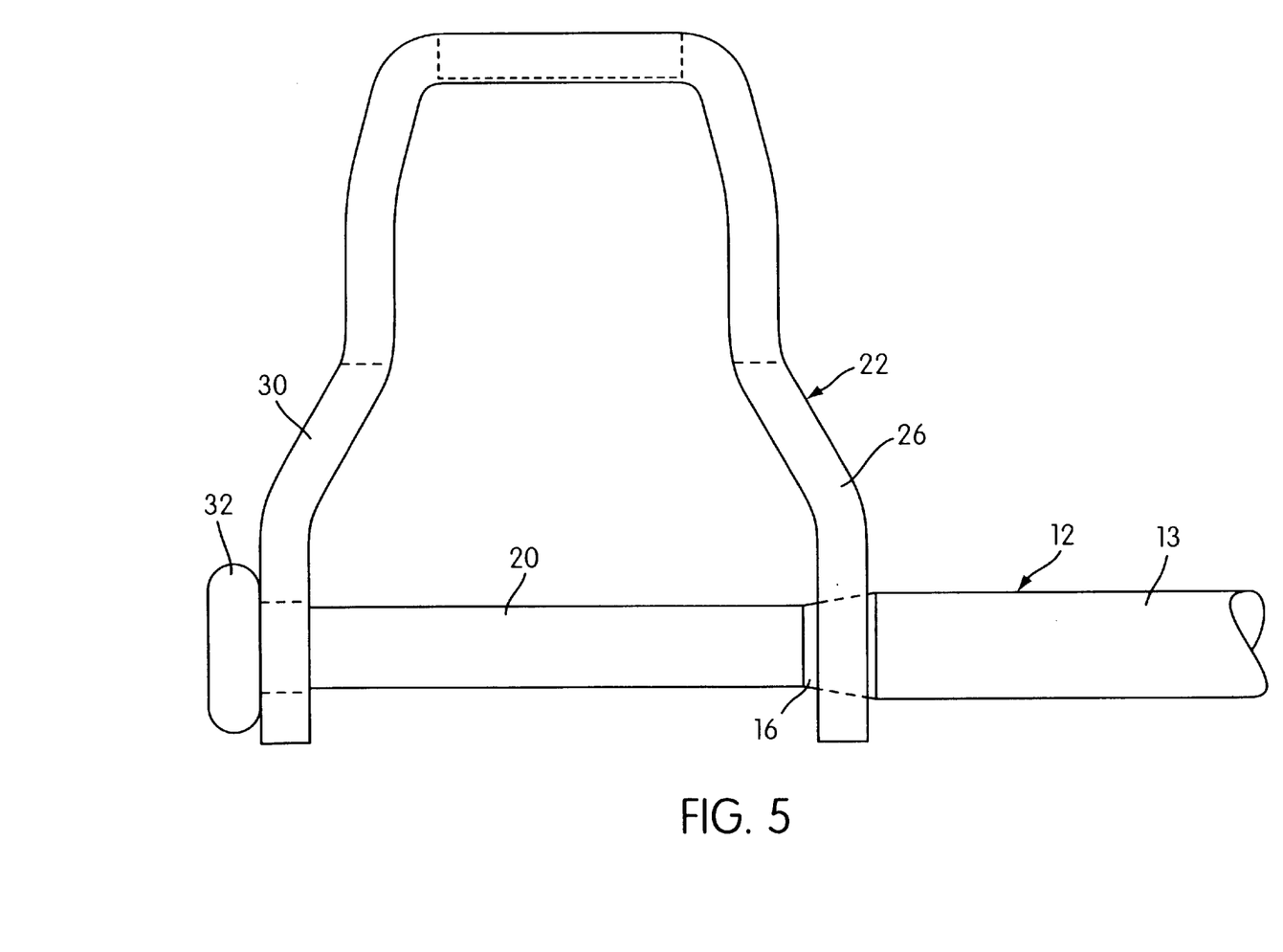
FIG. 5 is a detailed top plan view of the connective link, rod and buttonhead of FIG. 4.

As seen in FIGS. 4 and 5, chamfered transition area 16 of rod 12 is captured in tapered aperture 24 and reduced diameter portion 20 is received in round aperture 26. The chamfered transition area provides a construction that is stronger than a simple straight-cut transition and eliminates the high concentration of stresses present in a straight-cut transition. The rod is preferably made by using stock that has a diameter equal to the central area and cutting the chamfered transition area and reduced diameter area. The chamfered area and reduced diameter area could also be formed by rolling or any other means of manufacture to reduce the diameter.

Figure 6:
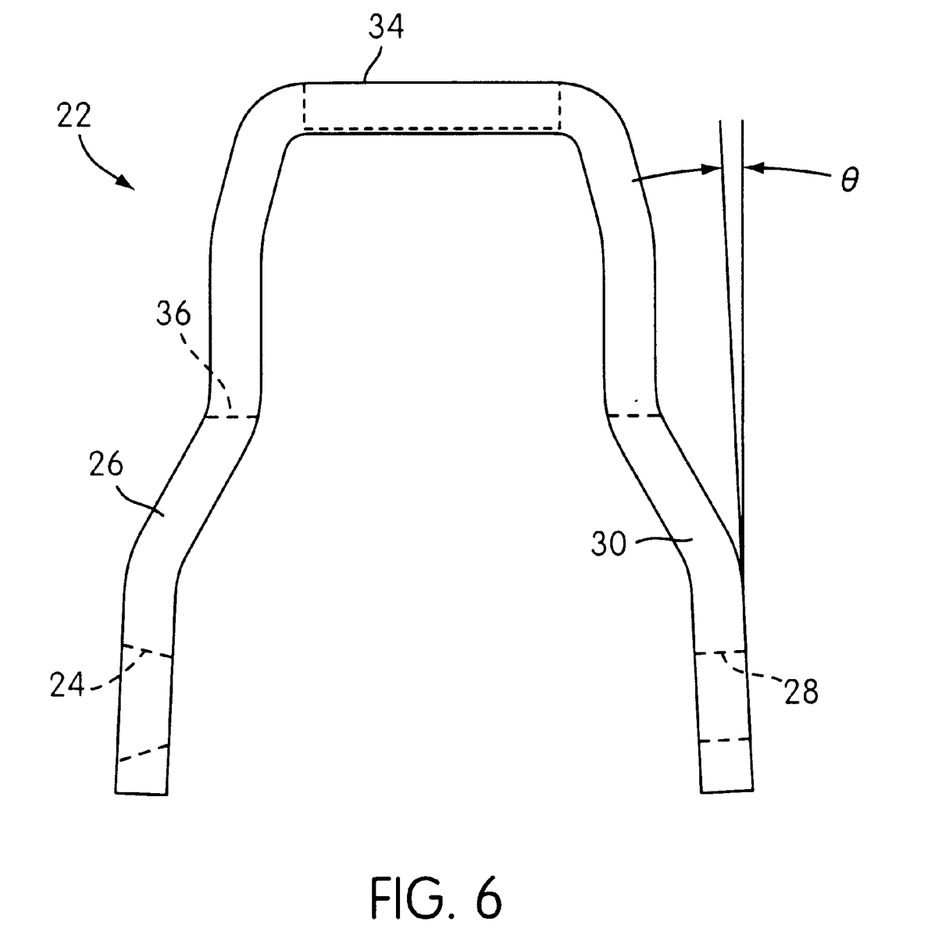
FIG. 6 is a detailed top plan view of a connective link of the present invention, specifically for use on the right side of a belt section as shown in FIGS. 1 and 2.
Figure 7:
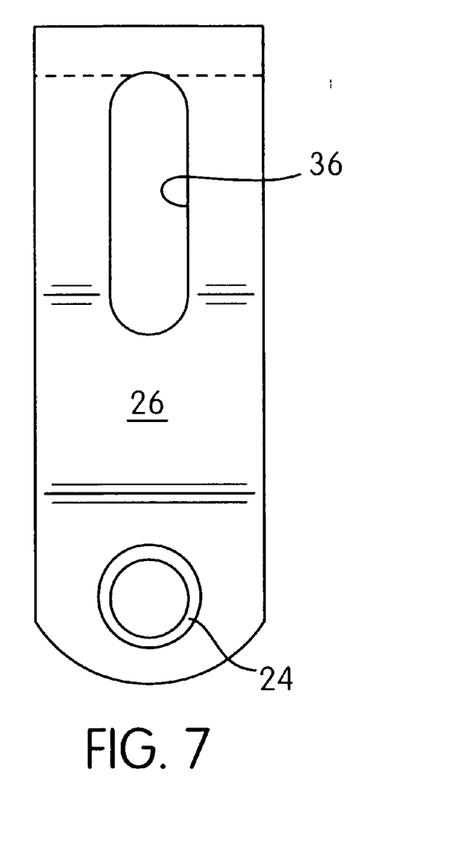
FIG. 7 is a side elevational view of the left side of the link shown in FIG. 6.
Figure 8:
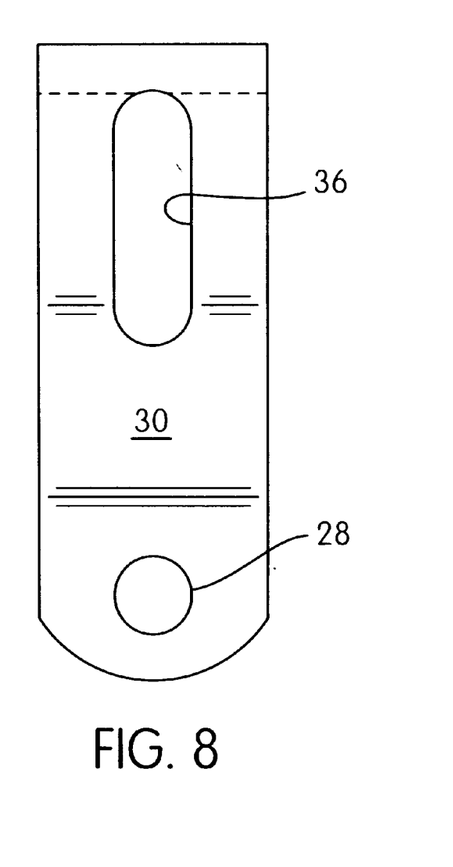
FIG. 8 is a side elevational view of the right side of the link shown in FIG. 6.
Figure 10:
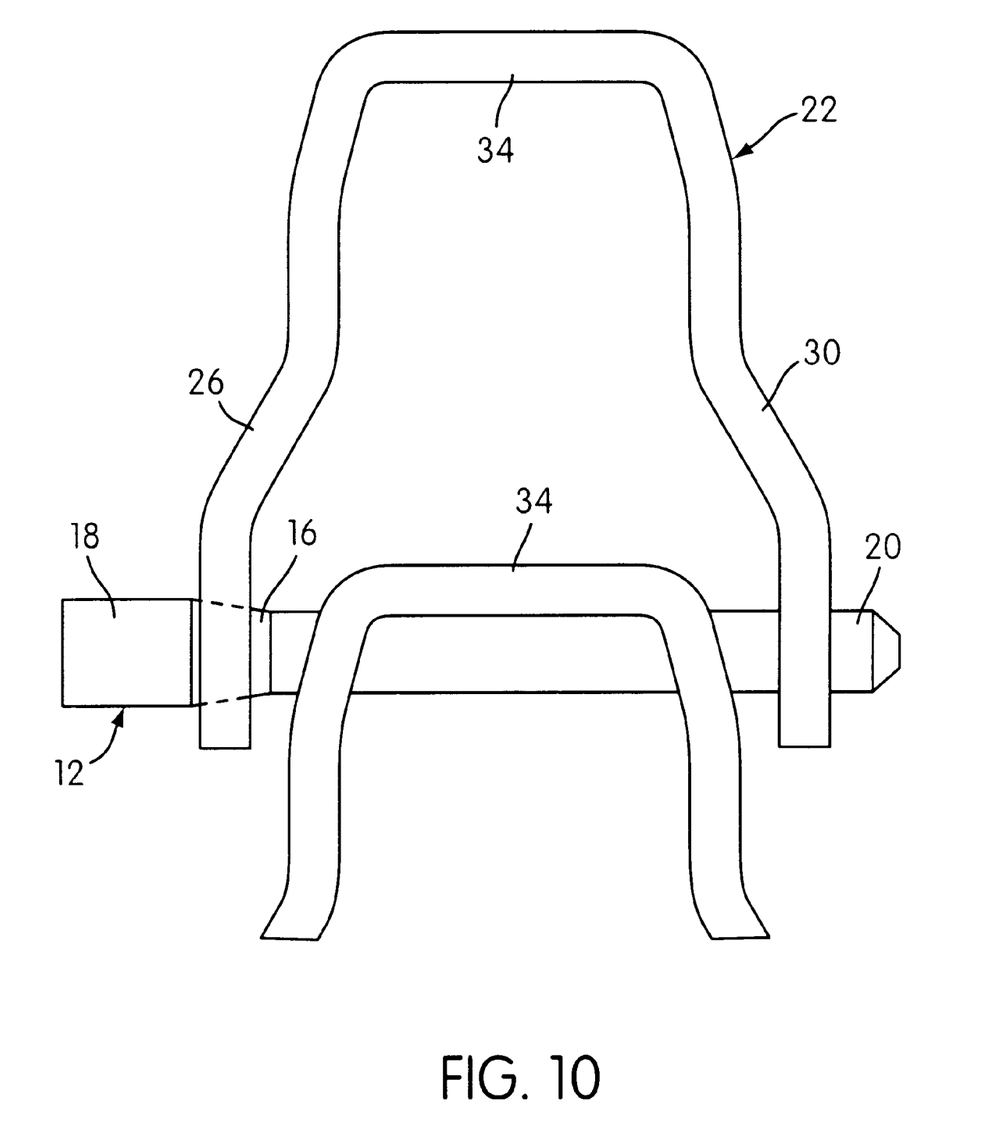
FIG. 10 is a schematic representation of the assembly of a rod to a connective link.
Figure 11:
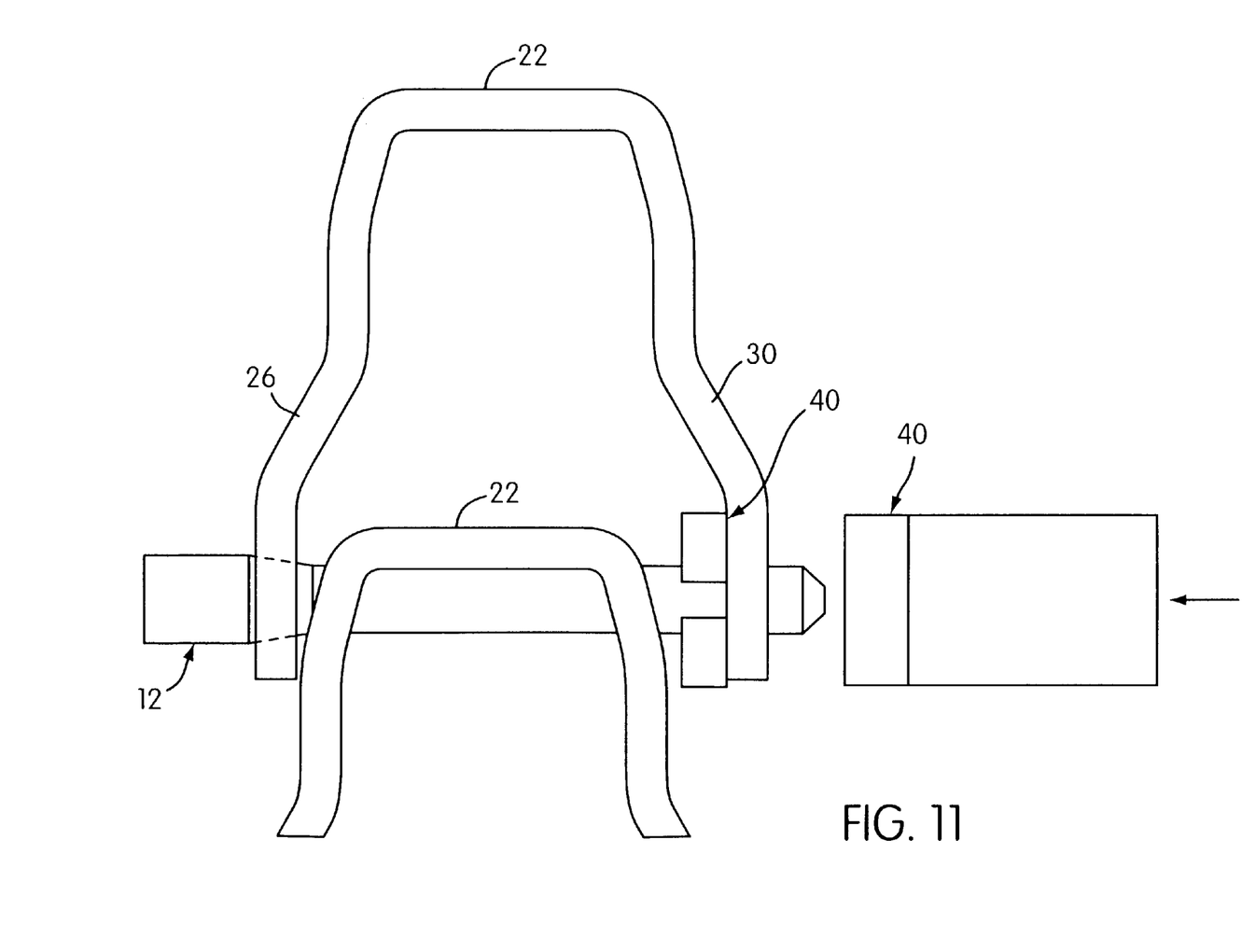
FIG. 11 is a schematic representation of the application of electrodes to the connective link and rod combination of FIG. 10 for attachment of the connective link to the rod and formation of a buttonhead.

FIGS. 6–8 illustrate link 22 in some detail with legs 26, 30 and cross-member 34. Elongated apertures 36 are provided adjacent between cross-member 34 on each leg 26 and 30 and the midsection of the link. Elongated apertures 36 receive rods and allow for the rods to move therein which allows for collapsing of the connective links relative to each other in an assembled belt which occurs when the belt traverses a lateral curve. As can be seen in FIGS. 7 and 8, apertures 24 and 28 are provided in legs 26 and 30 respectively for reception of rods. FIG. 10 illustrates a link 22 assembled to a rod. Once the link and rod are assembled together, a buttonhead 32 is formed at the end of the rod by applying electrodes 40 as seen in FIG. 11. Electrodes 40 are placed on the inside of leg 30 and to the end of the rod outside of leg 30. In this manner an upset or buttonhead is formed at the end of the rod and the rod is simultaneously fused within aperture 28. Application of the electrodes causes the metal rod to swell and fill up the aperture thereby fusing the link and rod together. This fusion combined with positive placement of the link on the rod made possible by the tapered section eliminates the need for any additional steps of attaching the link and rod to one another.

Figure 12:
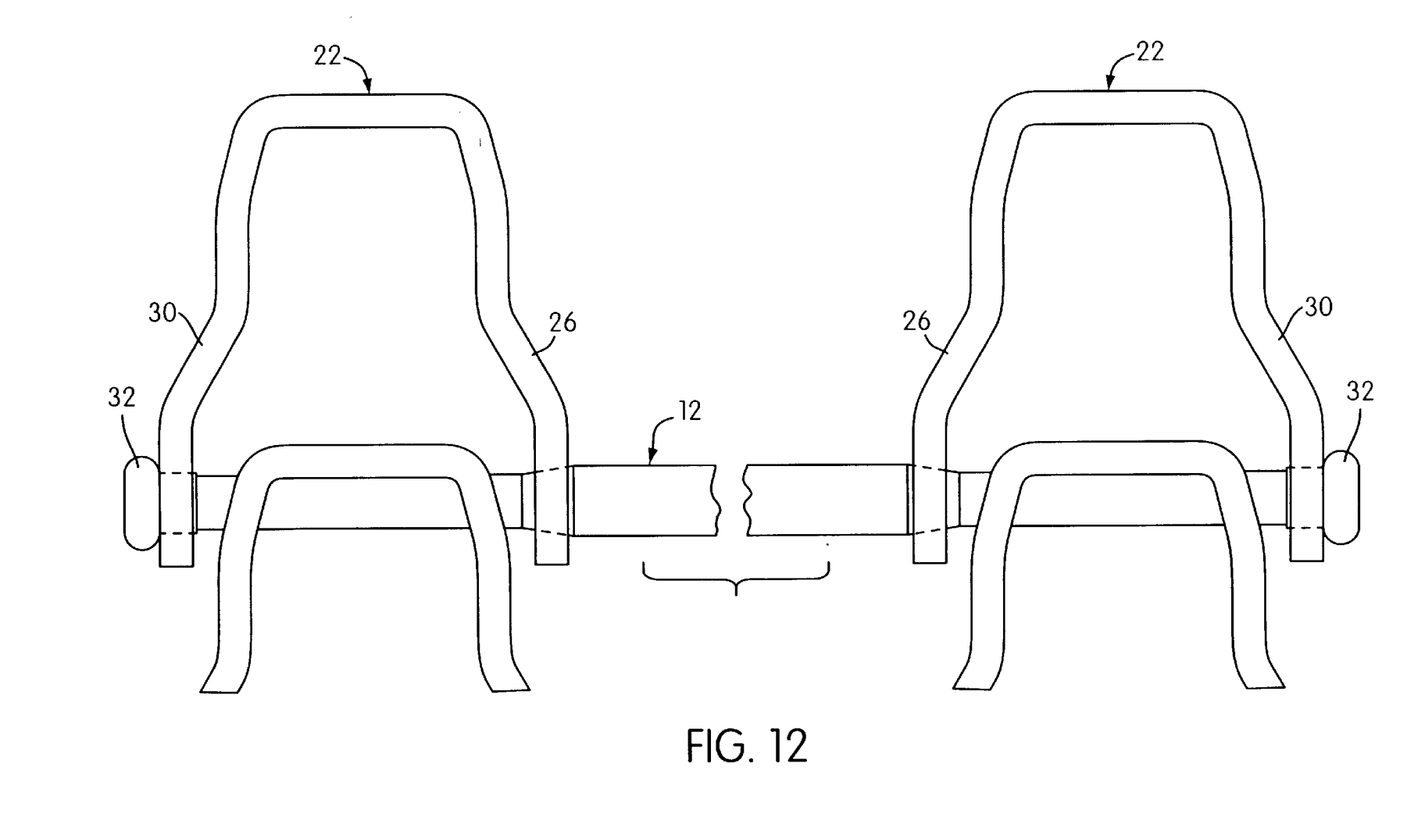
FIG. 12 is a detailed top plan view of a single rod of a belt section as shown in FIGS. 1 and 2 shown assembled and attached to its connective links.

Another feature of connective links 22 of the present invention is that the legs of the links have a slight outward flare, indicated as angle θ in FIG. 6, at rest. Angle θ is preferably less than 10°. When the links are assembled onto the rod and the buttonhead formed as seen in FIGS. 10–12, the legs of the link are compressed together with the inner leg being positively engaged to and constrained by tapered section 16 and the outer leg being constrained by buttonhead 32. The legs are compressed through angle θ on each side so that they are generally parallel. Thus when the link is assembled and constrained, lateral movement of the link relative to the rod is eliminated and the compression of the legs toward one another pre-loads the link for added strength when driving forces are applied to the belt.

Figure 9:
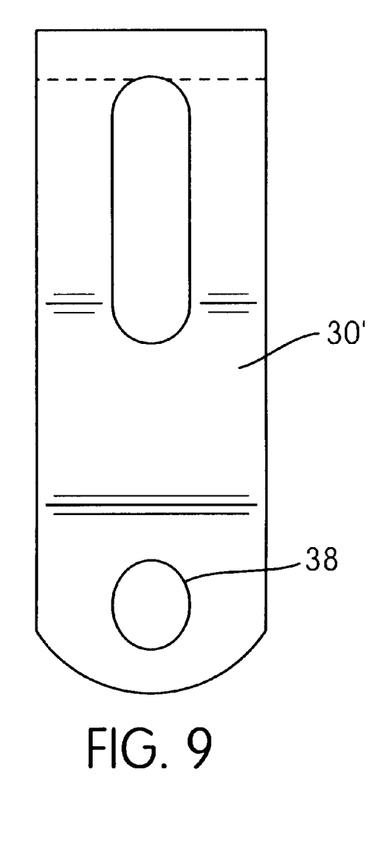
FIG. 9 a side elevational view of an alternative configuration of the right side of the link shown in FIG. 6.

FIG. 9 illustrates an alternative embodiment of link 22 with a modified outer leg. This leg has been labeled with a prime symbol as 30' to avoid any confusion. Leg 30' has an oval aperture 38 instead of a round one which is one way of enhancing the fusion of the link to the rod. As described above, the metal rod tends to fills the aperture when the upset or buttonhead is formed as shown in FIG. 11. By changing the shape of the aperture, the relationship of the rod and link is also changed. When the metal rod is inserted into an oval aperture and the electrodes applied, the metal rod fills the oval aperture and attaches the rod and link together so as to constrain rotational movement of the rod in the aperture. While an oval aperture is shown in the drawings, any non-circular shape to the aperture is contemplated to be within the scope of the invention. In this manner, by using a link with an out-of-round aperture on the outer leg, rotational movement of the link relative to the rod is structurally constrained without adding any manufacturing or attachment steps.

Constraining the link from movement relative to the rod in the lateral and rotational directions prevents the movements which result in fatigue stresses and failure in the prior art, and prevents the link from traversing inward on the rod, thus eliminating any additional manufacturing steps.

As can be seen in FIG. 10, two links 22 are assembled to a single rod in the nested manner shown, with this configuration repeated along the belt. The rod is received in the elongated aperture near the cross-member of one link as well as the aligned apertures on the legs of a neighboring link. In this manner, the rod can move relative to the first link (shown as the lower link) and is generally fixed in place with respect to the second link (shown as the upper link).

The attachment of the rod and link in the present invention is illustrated in FIG. 11 the first (or lower) link is moved inward and an electrode 40 is placed just inside of leg 30. Another electrode is applied from the outside of leg 30, and when the appropriate energy is applied, the rod and link are fused together in round aperture 28. In this way, link 22 is press fitted onto chamfered area 16 of the rod, or put another way the chamfered area of the rod is captured in the aperture, and then the link is fused to the rod in the round aperture 28 without the need for welding. The slight outward flare of the legs of the connective link also provides the clearance required for resistance welding the rod to the link in the manner described.

Figure 13:
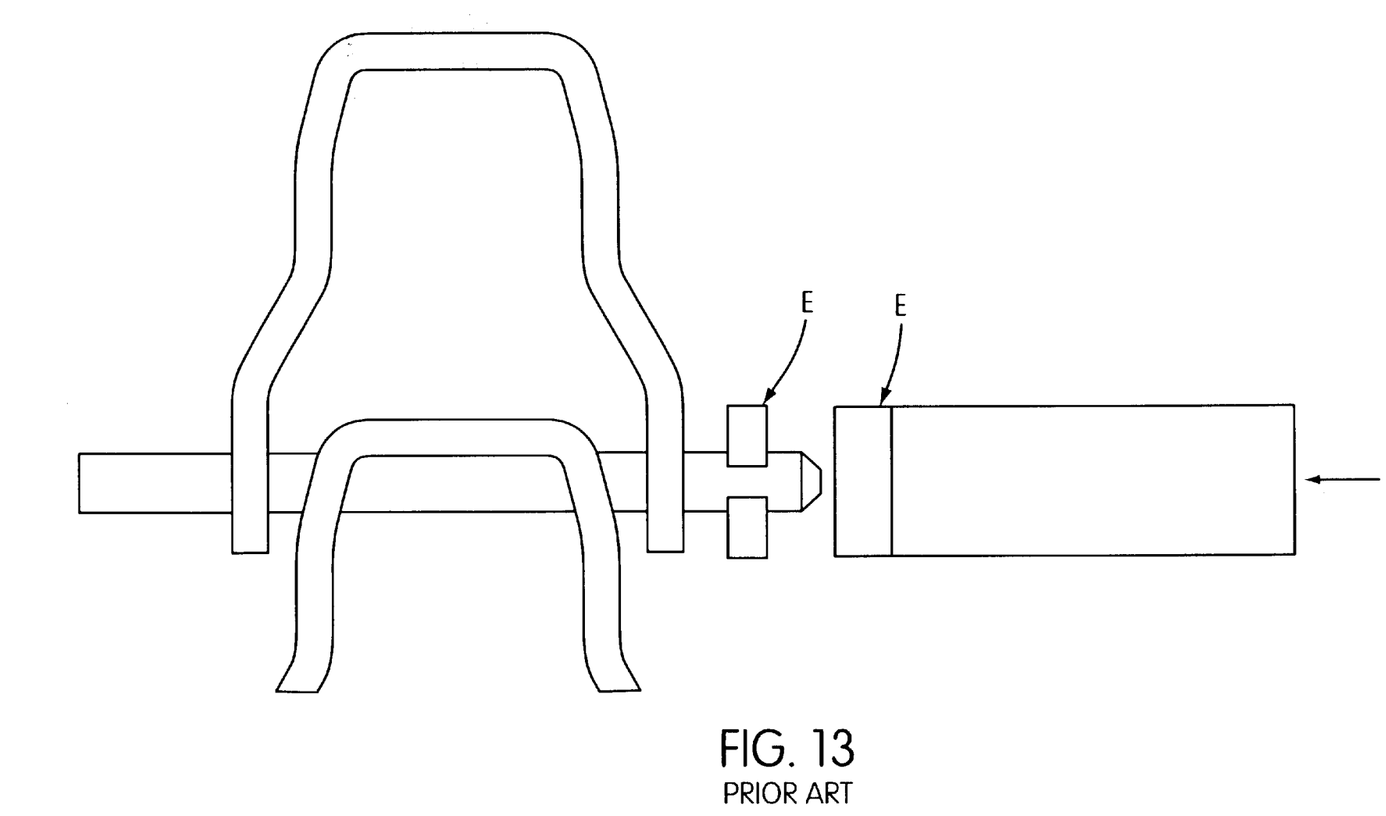
FIG. 13 is a schematic representation of the conventional application of electrodes for attaching a connective link to a rod.
Figure 14A:
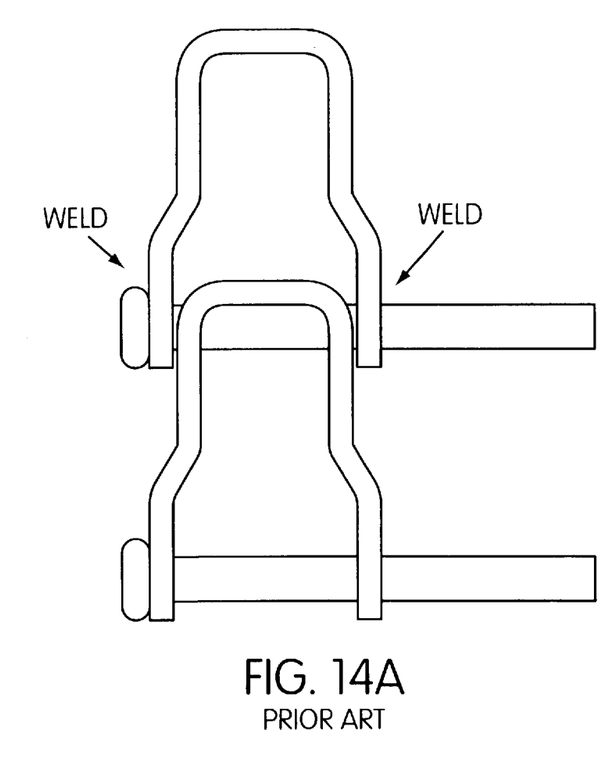
FIG. 14A is a schematic representation of the conventional welding process for attaching a connective link to a rod.
Figure 14B:
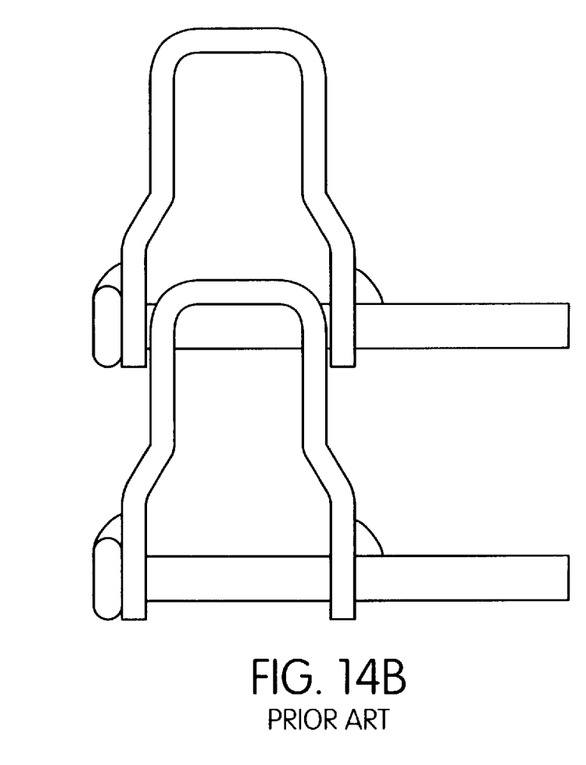
FIG. 14B is a top plan view of the links and rod of FIG. 14A shown welded together in the conventional manner.

In the prior art, FIGS. 13–14B, rods of uniform diameter were used so that the links could be moved laterally during manufacture. One conventional method of securing the rod to the link, FIG. 13, was to place electrodes E at the outer leg of the link and apply the appropriate energy. This would form the buttonhead to ensure that the links could not slide off of the end of the rod, but would not provide attachment of the rod and link. In order to attach the rod and link together, a secondary attachment step, FIGS. 14A–14B, was to weld the legs of each individual link to the rod and buttonhead to affix the link thereto. This welding step is laborious and time-consuming.

Eliminating the prior art weld between the links and rods also eliminates the perceived failure of the belt by the users who are attuned to look for cracked or fractured welds as a sign of failure. Thus premature repair or replacement of the belt and the attendant warranty issues are avoided.

While the preferred embodiment described herein used a rod of increased diameter in the central area to achieve the wider, stronger belt, the parameters may be varied to achieve other objectives. The main parameters of the conveyor belt construction are (i) the link size, (ii) the diameter of the rod at the ends, (iii) the diameter of the rod at the central area, (iv) the shape and size of the transition portion, and (v) how the transition portion is formed.

Although the present invention has been illustrated in terms of preferred embodiments, it will be evident that numerous changes, adaptations, and modifications may be made without departing from the scope of the invention which is to be limited only by the appended claims.

We claim:

1. A conveyor belt comprising:
   a plurality of longitudinally spaced rods each extending in a lateral direction and including a central material conveying section of a first constant diameter between end sections each comprising an portion end of a second constant diameter, said first diameter being greater than said second diameter, and a tapered transition portion between said central section and each said end portion; and
   a plurality of connective links connecting said rods together to form said belt, each connective link comprising legs extending in a longitudinal direction from a lateral cross-member at a closed first end to an open second end, each said link defining first laterally aligned apertures on each of said legs at said closed end and second laterally aligned apertures at said open end for reception of a rod, one of said second laterally aligned apertures of said link engaging said tapered transition portion of said end section of said rod received therein to laterally confine said link to said end section and prevent lateral movement of said link along said rod onto said central section;
   wherein a repeated arrangement of said links whereby the first apertures of a first link are aligned with the second apertures of a second link for reception of a rod thereinto provides a conveying surface bounded by connective links at lateral sides.

2. The conveyor belt of claim 1, further comprising a buttonhead formed at each of said ends of said rods to further constrain said links from lateral movement along said rods.

3. The conveyor belt of claim 1, wherein at last one of said second apertures on each of said links is tapered to said tapered section of said rods to positively place said link onto said rod and prevent lateral movement of said link along said rod.

4. The conveyor belt of claim 1, wherein said rods are fused to said apertures of said links to prevent lateral and rotational movement of said links relative to said rods.

5. The conveyor belt of claim 1, wherein at least one of said second apertures on said links is a non-circular aperture to constrain a rod received therein from rotational movement.

6. The conveyor belt of claim 5, wherein said non-circular aperture is an oval.

7. The conveyor belt of claim 1, wherein said legs of said links are configured to be pre-loaded when assembled with said rods to form said belt.

8. The conveyor belt of claim 7, wherein said legs of each said link are flared outwardly from one another at rest with a spacing therebetween that is greater than the distance between said tapered section of said rod and a buttonhead formed at said rod end such that said legs of said link are pressed together during assembly and constrained from lateral movement along said rod.

9. A connective link for a conveyor belt assembly comprising a plurality of transverse rods interconnected by a plurality of connective links, said connective link comprising:
   a lateral cross-member forming a closed end;
   a pair of generally parallel legs extending in a longitudinal direction from said lateral cross-member to an open end, first laterally aligned apertures defined on each of said legs at said closed end for reception of a rod, and second laterally aligned apertures defined at said open end for reception of a rod, at least one of said second apertures being tapered to receive a correspondingly tapered section of a rod.

10. The connective link of claim 9, wherein another one of said second apertures is non-circular to define a constraining geometry for a rod inserted and fused therein.

11. The connective link of claim 9, wherein said first apertures are elongated to allow rods received therein to move in the longitudinal direction thereby providing collapsibility to adjacent links of an assembled conveyor belt.

12. The connective link of claim 9, wherein said legs are flared outwardly from one another at rest and configured to be compressed toward one another and constrained from lateral movement when assembled to form a conveyor belt.

13. A conveyor belt comprised of a repeated arrangement of interconnected rods and connective links, said connective links each including a lateral cross-member and a pair of legs extending perpendicularly therefrom, said legs having a first set of laterally aligned apertures for reception of a rod and a second set of laterally aligned apertures for reception of a rod, said links arranged such that the first apertures of a first link are aligned with the second apertures of a second link for reception of a rod thereinto, each said rod comprising a locking element comprising a tapered section of said rod disposed between sections of varying diameters, said locking element disposed at an end thereof and each said connective link comprising a corresponding rod fixation element formed on one of said apertures for constraining movement of said link relative to said rod.

14. The conveyor belt of claim 13, wherein said rod fixation element comprises a tapered aperture corresponding to the taper of said rod to positively engage said link to said rod.

15. The conveyor belt of clam 13, wherein said rod fixation element comprises a non-circular aperture for reception of said rod.

16. A method of making a conveyor belt comprising a plurality of transverse rods interconnected by U-shaped connective links, said method comprising the steps of:
   providing rods a central section with a chamfered section proximate each of their ends;
   arranging the connective links in a nested fashion to align first apertures of one link to second apertures of another link;
   inserting the ends of a rod into nestingly aligned apertures so that the inner legs of the links are affixed to the chamfered sections of the rods, and the outer legs of the links are disposed at the ends of the rods;
   confining the links near the ends of the rods by forming a buttonhead at the ends of the rods and affixing the rods to the outer legs of the links to form the conveyor belt with lateral constraints on the movement of the links along the rods onto the central section of the rods.

17. The method of claim 16, further comprising placing electrodes to the inside of the outer leg of each link and to the end of the rods.

18. The method of claim 17, wherein each buttonhead is formed by deforming the end of the rod.

19. The method of claim 17, wherein the step of affixing the rods to the links is accomplished by resistance welding.

20. A method of making a conveyor belt comprising a plurality of transverse rods interconnected by U-shaped connective links, said method comprising the steps of:

provviding rods with chamfered section near their ends;

arranging the connective links in a nested fashion to align first apertures of one link to second apertures of another link;

inserting the ends of a rod into nestingly aligned apertures so that the inner legs of the links are affixed to the chamfered sections of the rods, and the outer legs of the links are disposed at the ends of the rods;

forming a buttonhead at the ends of the rods and affixing the rods to the outer legs of the links to form the conveyor belt with lateral constraints on the movement of the links along the rods; and a step of pre-loading the links to resist lateral movement of the links along the rods and withstand the driving friction of the conveyor belt.

21. The method of claim 20, wherein said step of pre-loadng the links comprises compressing the flared legs of the links between the buttonheads and the chamfered section of the rods.

22. The method of claim 16, further comprising a step of rotationally constraining the links from rotational movement about the rods by fusing the rods in the link apertures.

23. The method of claim 22, wherein said rotationally constraining step further comprises providing a non-circular aperture in the outer leg of the links to receive the rod and conforming the rod to the shape of the non-circular aperture.

24. A conveyor belt comprising:

a plurality of longitudinally spaced rods each extending in a lateral direction defining first and second ends between a central material conveying section, said ends being of reduced diameter with respect to said central section and a tapered transition section between said central section each said end; and a plurality of connective links connecting said rods together to form said belt, each connective link comprising legs extending in a longitudinal direction from a lateral cross-member at a closed first end to an open second end, each said link defining first laterally aligned apertures on each of said legs at said closed end and second laterally aligned apertures at said open end for reception of a rod, at least one of said second laterally aligned apertures of said link being tapered to engage said tapered transition section of said rod received therein to positively locate said link onto said rod and prevent lateral movement of said link along said rod;

wherein a repeated arrangement of said links whereby the first apertures of a first link are aligned with the second apertures of a second link for reception of a rod thereinto provides a conveying surface bounded by connective links at lateral sides.

25. The conveyor belt of claim 24, wherein said rods are fused to said apertures of said links to prevent lateral and rotational movement of said links relative to said rods.

26. The conveyor belt of claim 24, wherein at least one of said second apertures on said links is a non-circular aperture to constrain a rod received therein from rotational movement.

27. The conveyor belt of claim 26, wherein said non-circular aperture is an oval.

28. The conveyor belt of claim 24, wherein said legs of said links are configured to be pre-loaded when assembled with said rods to form said belt.

29. The conveyor belt of claim 28, wherein said legs of each said link are flared outwardly from one another at rest with a spacing therebetween that is greater than the distance between said tapered section of said rod and a buttonhead formed at said rod end such that said legs of said link are pressed together during assembly and constrained from lateral movement along said rod.

* * * * *